Feb. 1, 1966  G. PFEIFER ETAL  3,232,644
TWIST LOCK CHECK VALVE
Original Filed Dec. 23, 1960  2 Sheets-Sheet 1
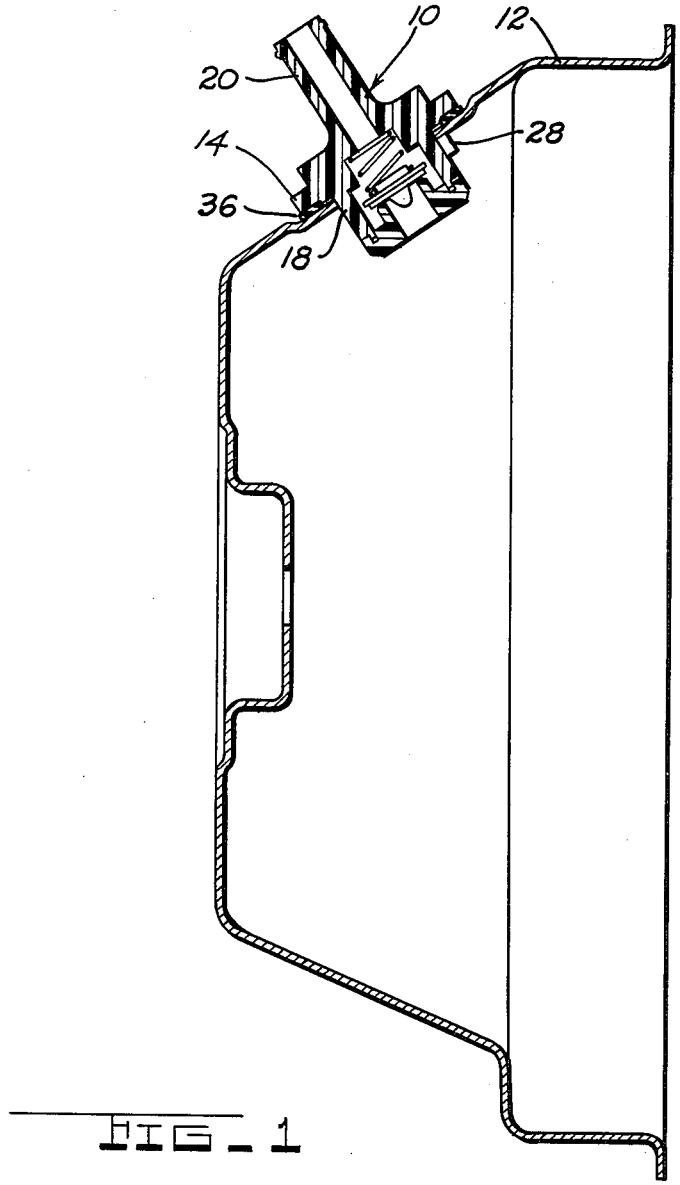
FIG_1
INVENTORS
GUNTHER PFEIFER.
THOMAS M. JULOW.
BY
William P. Hickey
ATTORNEY.

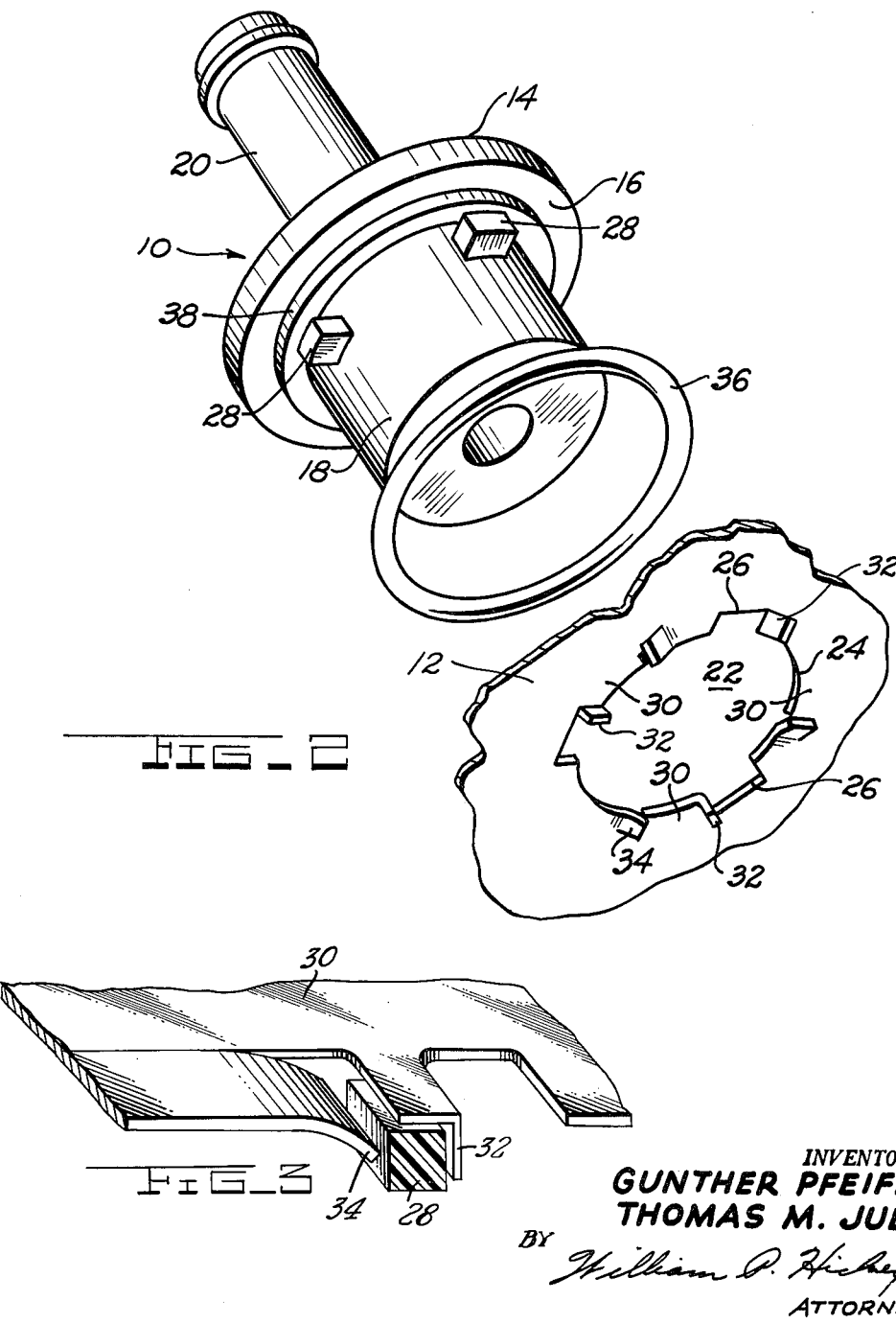

United States Patent Office 3,232,644
Patented Feb. 1, 1966

3,232,644
TWIST LOCK CHECK VALVE
Gunther Pfeifer and Thomas M. Julow, South Bend, Ind., assignors to The Bendix Corporation, South Bend, Ind., a corporation of Delaware
Continuation of application Ser. No. 78,125, Dec. 23, 1960. This application Sept. 5, 1963, Ser. No. 306,776
2 Claims. (Cl. 285—194)

The present invention relates to means for providing a sealing connection between a tubular member and a housing made of a flat plate; and more particularly to means for sealingly attaching a valve body to a housing structure made of a plate. This application is a continuation of my parent application No. 78,125, filed December 23, 1960, now abandoned.

An object of the present invention is the provision of new and improved means for quickly attaching a tubular member to a plate structure.

A more particular object of the present invention is the provision of new and improved means for simply and inexpensively sealingly attaching a valve body to a plate structure.

The invention resides in certain constructions and combinations and arrangements of parts; and further objects and advantages of the invention will become apparent to those skilled in the art to which the invention relates from the following description of the preferred embodiment described with reference to the accompanying drawings forming a part of this specification, and in which:

FIGURE 1 is a cross sectional view of a portion of a sheet metal housing onto which a check valve structure is attached by means of principles of the present invention;

FIGURE 2 is a fragmentary oblique exploded view showing the portion of the housing member shown in FIGURE 1 onto which the check valve is sealingly attached, together with the sealing ring and check valve in an aligned unassembled position; and FIGURE 3 is a broken cross sectional view of the housing member showing the locking action holding the check valve structure in its assembled position.

Although the invention may be otherwise embodied, it is herein shown and described as an attachment means for a tubular check valve body 10 to one section 12 of a stamped sheet metal shell of a fluid pressure servomotor. The housing section 12 shown in the drawing corresponds generally to that shown in the Oswald O. Kytta U.S. Patent No. 3,096,689; and for a more complete understanding of the construction and operation of the servomotor to which the check valve is attached, reference may be had to that application.

The tubular check valve body 10 has a generally radially extending flange 14 thereon which provides a shoulder 16. The tubular check valve body 10 also includes a cylindrical body section 18 which projects out of the shoulder 16, and also includes a generally tubular portion 20 on the opposite side of the flange 14 for the attachment of a vacuum hose not shown.

The sheet metal housing 12 is provided with an opening 22 therethrough, the main portion 24 of which is shaped to receive the cylindrical body section 18 of the tubular body 10. The opening 22 further includes at least two radially outwardly extending notch portions 26 that are shaped to receive corresponding fingers 28 which are formed radially on the periphery of the cylindrical body section 18, and are spaced from the shoulder 16 by a distance greater than the thickness of the sheet metal housing 12. In the preferred embodiment shown in the drawings three fingers 28 are provided, and the fingers 28 are generally rectangularly shaped.

It is intended that the tubular check valve body 10 will be assembled to the sheet metal housing 12 by inserting the cylindrical body section 18 through the opening 24 with the fingers 28 passing through the notched portions 26. Once the fingers have cleared the inside surface of the sheet metal housing 12, the tubular check valve body 10 is rotated to cause the fingers 28 to slide over the shelf portions 30 which border the main portion 24 of the opening and extend between the notches 26. It is intended that the tubular check valve body 10 will always be rotated in but a single angular direction once it has been inserted in the opening 22; and that, therefore, the sheet metal housing 12 will have one shelf portion 30 which cooperates with one of the notches 26 to receive and hold one of the fingers 28 of the tubular body member 10.

In order that the fingers 28 will be locked into position once they are rotated into a position overlying the shelves 30; at least one of the shelves 30 has an abutment portion 32 which is formed by turning a portion of the shelf radially inwardly at approximately 90°. The abutment portion 32 catches the side edge of one of the fingers 28 and prevents further rotation of the tubular body 10 so that the fingers 28 cannot become aligned with the next succeeding notch openings and thereby removed. In order to prevent vibration, etc., from rotating the tubular body 10 backwardly to a position wherein the fingers 28 again align with the notches 26 through which they were inserted, at least one of the shelf portions 30 is provided with a ramp 34 on its inside surface which is inclined out of the inside surface of the shelf in the direction of the abutment portion 32. In the preferred embodiment shown in the drawing, the ramp 34 is formed by shearing the shelf radially away from the main portion 24 of the opening, and then circumferentially; so that the ramp 34 terminates in a generally vertical edge surface facing in the direction of the abutment portion 32. The ramp 34 is so spaced as to fall on one side of one of the fingers 28 and have a biting edge contact therewith when the abutment portion 32 is positioned on the other side of one of the fingers 28.

The attachment structure shown in the drawing further includes a ring of sealing material 36 that is positioned about the cylindrical body section 18 and is clamped between the outside surface of the sheet metal housing 12 and the shoulder 16. The opening through the ring of sealing material 36 is preferably larger than the imaginary circle which would connect the tips of the notches 26, so as to have a continuous sealing surface of the sheet metal housing 12 on which to seal. The ring of sealing material 36 may be of any suitable material and shape, and as shown in the drawing is a neoprene O-ring. The ring of sealing material 36 has an axial thickness which when added to the thickness of the plate 12 is greater than the clearance between the fingers 28 and the shoulder 16; so that it is necessary to compress the ring of sealing material 36 in order for the fingers 28 to pass all the way through the opening 22 in the plate 12. Axial force is exerted upon the tubular body 10 to force the fingers 28 through the notches 26, and the tubular body 10 is then rotated to cause the fingers 28 to ride up the ramps 34 and then become locked between the ramp 34 and an abutment portion 32. The compression of the sealing material 36 holds the fingers 28 locked betwen the vertical edges of the ramp 34 and abutment portion 32; so that the tubular body 10 can only be removed by applying an inward force to the tubular body 10 by an amount which will cause the fingers 28 to ride clear of the ramp 34. In the embodiment shown in the drawing the ramps 34 project approximately 0.030 inch out of the inner surafce of the housing member 12, and the abutment portions 32 are meant to project approximately 0.100 inch out of the inner surface of the housing member 12.

In some instances the compression of the ring of sealing material 36 will provide a sufficient frictional force to hold the ring of sealing material 36 in place. In other instances, particularly where large pressures are to be retained, one of the check valve body, or housing members, will be provided with a cylindrical surface which abuts the sealing material 36 and prevents its being blown out of its sealing position. In the preferred embodiment shown in the drawing, a cylindrical surface 38 is provided on the check valve body 10 adjacent the shoulder 16. Inasmuch as vacuum is to be retained inside of the housing section 12, the cylindrical surface 38 is provided by a small shoulder positioned against the inside of the sealing member 36, and corresponds generally in the diameter to the previously referred to imaginary circle connecting the tips of the notches 26. This will prevent "blow-in" of the seal 36. In the embodiment shown in the drawing, the distance between the small shoulder which forms the surface 38 and the fingers 28 provides sufficient clearance to receive the plate 12 and its ramp 34. In those instances where a higher pressure is to be retained inside of the housing 12 than is experienced outside of the housing, a cylindrical surface may be formed radially outwardly of the ring of sealing material 36, so as to hold the material in place. In our case we have provided a recessed portion in the housing section 10. The side walls of this recessed portion act to hold the ring 36 inwardly against the surface 38 during assembly.

While the invention has been described as utilizing a generally circular opening with radially outwardly extending and rectangularly shaped notch portions, the invention is not to be construed as being limited thereto, and in some instances the opening may be of a triangular or square shape.

While the invention has been described in considerable detail, we do not wish to be limited to the particular constructions shown and described; and it is our intention to cover hereby all novel adaptations, modifications and arrangements thereof which come within the practice of those skilled in the art to which the invention relates.

We claim:
1. Attachment structure comprising:
   a plate member having inner and outer sides and an opening therethrough, said plate defining radially outwardly extending notches extending from said opening into said plate the opposed sides of said notches being defined by substantially radially extending walls of said plate;
   a radially extending tab portion normal to said inner side at one of said radially extending walls of each of said notches;
   a ramp means between said notches comprising a planar surface depending from said inner side and partly defining said opening and disposed at an angle to said plate, said ramp means extending toward said tab and terminating in a shear edge, said shear edge and said tab portion being spaced a distance substantially equal to the width of said notches;
   a generally tubular member substantially equal in diameter with said opening, said tubular member having an annular external stepped shoulder with the smaller portion thereof of a diameter equal to a circle enclosing peripheral portions of said notches, said tubular member having at least one projecting finger of a dimension to be received by said notches, said finger being inwardly spaced from said stepped shoulder a distance substantially equal to a cross section of said plate member; and
   a ring of resilient sealing material fitted to said smaller portion under said larger portion above and outward of said fingers, said sealing material of a cross sectional dimension to extend into an area between said smaller portion such that said ring will be compressed between said plate member and the larger stepped shoulder portion of said tubular member along the entire surface of said ring, said ring being retained from blow-in by said smaller stepped shoulder portion being inward thereof.

2. Attachment structure according to claim 1 wherein said plate member is provided with a recessed portion of a diameter substantially equivalent to that of the larger portion of said shoulder of said tubular member to hold said ring inwardly against said smaller portion of said stepped shoulder.

References Cited by the Examiner
UNITED STATES PATENTS

| | | | |
|---|---|---|---|
| 978,504 | 12/1910 | Stewart | 285—209 |
| 1,644,153 | 10/1927 | Schriner | 285—204 |
| 1,788,282 | 1/1931 | Drager | 285—208 |
| 2,151,702 | 3/1939 | Ilg | 285—204 |
| 2,524,995 | 10/1950 | Sassano. | |

CARL W. TOMLIN, *Primary Examiner.*